(12) United States Patent
Sazegari et al.

(10) Patent No.: US 8,370,822 B2
(45) Date of Patent: Feb. 5, 2013

(54) COMPILING TECHNIQUES FOR PROVIDING LIMITED ACCURACY AND ENHANCED PERFORMANCE GRANULARITY

(75) Inventors: Ali Sazegari, Cupertino, CA (US); Stephen Tyrone Canon, Palo Alto, CA (US)

(73) Assignee: Apple Inc., Cupertino, CA (US)

(*) Notice: Subject to any disclaimer, the term of this patent is extended or adjusted under 35 U.S.C. 154(b) by 1081 days.

(21) Appl. No.: 12/275,178

(22) Filed: Nov. 20, 2008

(65) Prior Publication Data

US 2010/0125836 A1    May 20, 2010

(51) Int. Cl.
*G06F 9/45* (2006.01)
(52) U.S. Cl. .................. 717/152; 717/151; 717/154
(58) Field of Classification Search .................. 717/152, 717/154
See application file for complete search history.

(56) References Cited

U.S. PATENT DOCUMENTS

| | | | |
|---|---|---|---|
| 5,515,535 A * | 5/1996 | Frankel et al. | 717/149 |
| 6,247,174 B1 * | 6/2001 | Santhanam et al. | 717/154 |
| 6,625,797 B1 * | 9/2003 | Edwards et al. | 716/103 |
| 7,043,721 B2 * | 5/2006 | Bates et al. | 717/140 |
| 7,171,649 B1 * | 1/2007 | Lawrence | 717/116 |
| 7,703,085 B2 * | 4/2010 | Poznanovic et al. | 717/140 |
| 2003/0167462 A1 * | 9/2003 | Harrison et al. | 717/154 |
| 2004/0093319 A1 * | 5/2004 | Ogasawara et al. | 707/1 |
| 2004/0243988 A1 | 12/2004 | Ota | |
| 2011/0119471 A1 * | 5/2011 | Norin et al. | 712/222 |

OTHER PUBLICATIONS

Dietz et al., "Floating-Point Computation with Just Enough Accuracy," Springer-Verlag, 2006, 8pg.*
Kum et al., "A Floating-Point to Integer C Converter With Shift Reduction for Fixed-Point Digital Signal Processors," IEEE, 1999, 7pg.*
Ogasawara et al., "Optimizing precision overhead for x86 processors," John Wiley & Sons, 2004, 19pg.*
Tong et al., "Reducing Power by Optimizing the Necessary Precision/Range of Floating-Point Arithmetic," IEEE, 2000, 14pg.*
Misha Brukman et al., "Extending LLVM: Adding instructions, intrinsics, types, etc.," Sep. 22, 2007.

* cited by examiner

*Primary Examiner* — Li B Zhen
*Assistant Examiner* — Ryan Coyer
(74) *Attorney, Agent, or Firm* — Blakely, Sokoloff, Taylor & Zafman LLP

(57) ABSTRACT

A programmable compiler detects from source code invocations of math functions that require reduced levels of accuracy, limited variable domains, or enhanced performance. The programmable compiler replaces such invocations with intrinsics from the compiler's own intrinsic library. The math function invocations are compiled into inline object code. The inline object can be subsequently optimized along with other object code through normal compiler optimization. If an accuracy requirement is beyond what any compiler intrinsic can provide, the programmable compiler preserves the invocation of the math function defined in a default library.

57 Claims, 14 Drawing Sheets

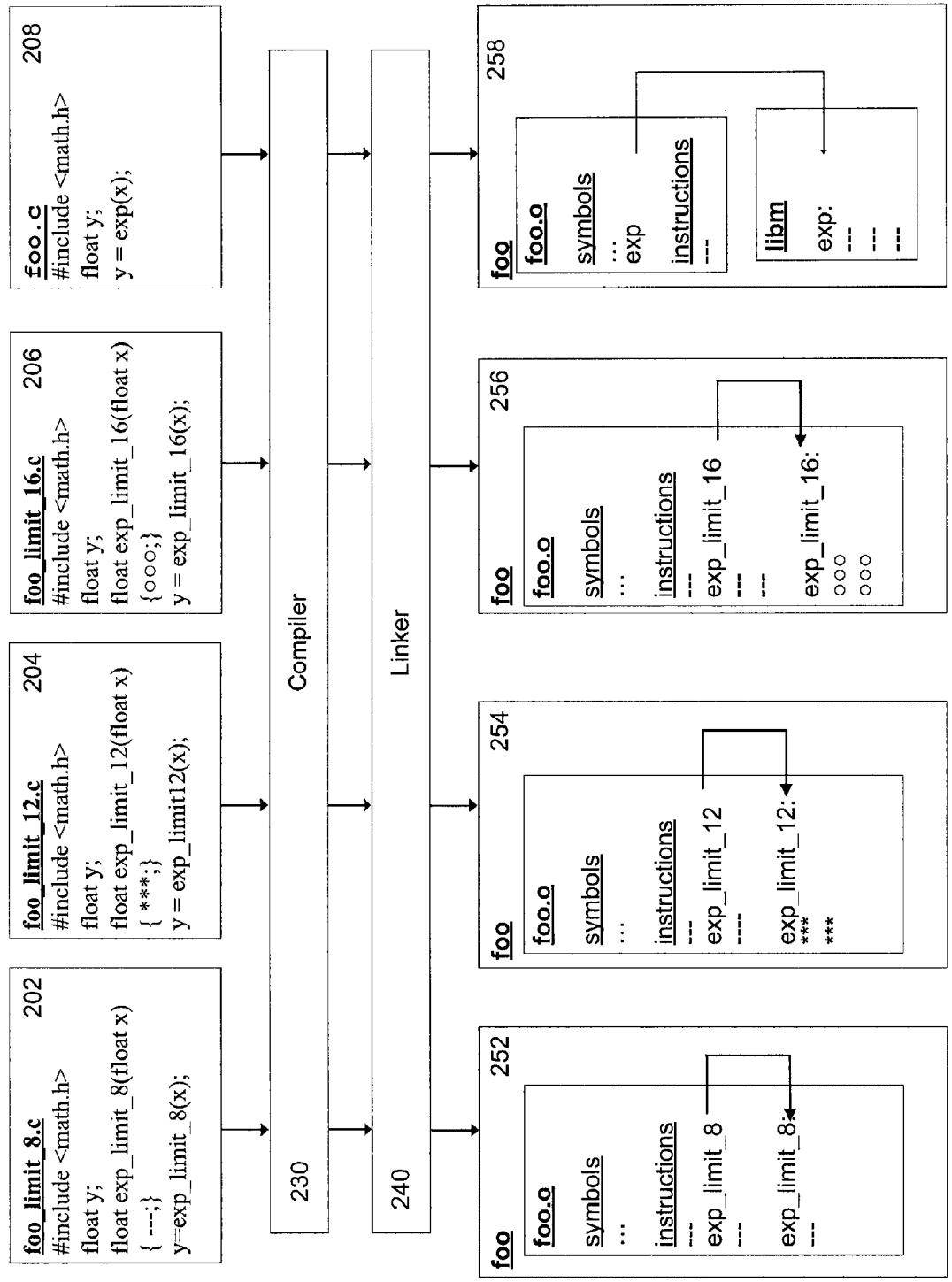
FIG. 2-A

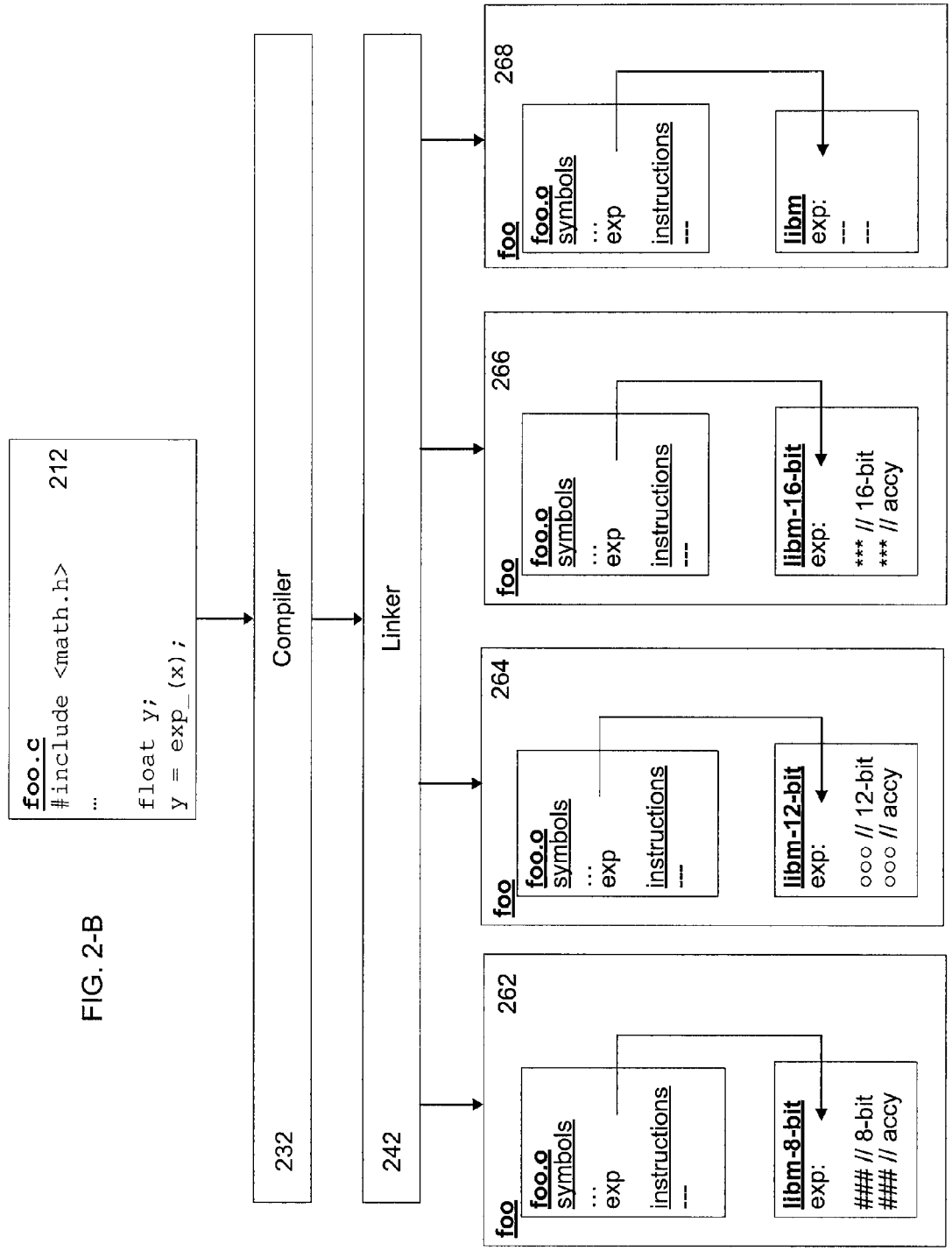
FIG. 2-B

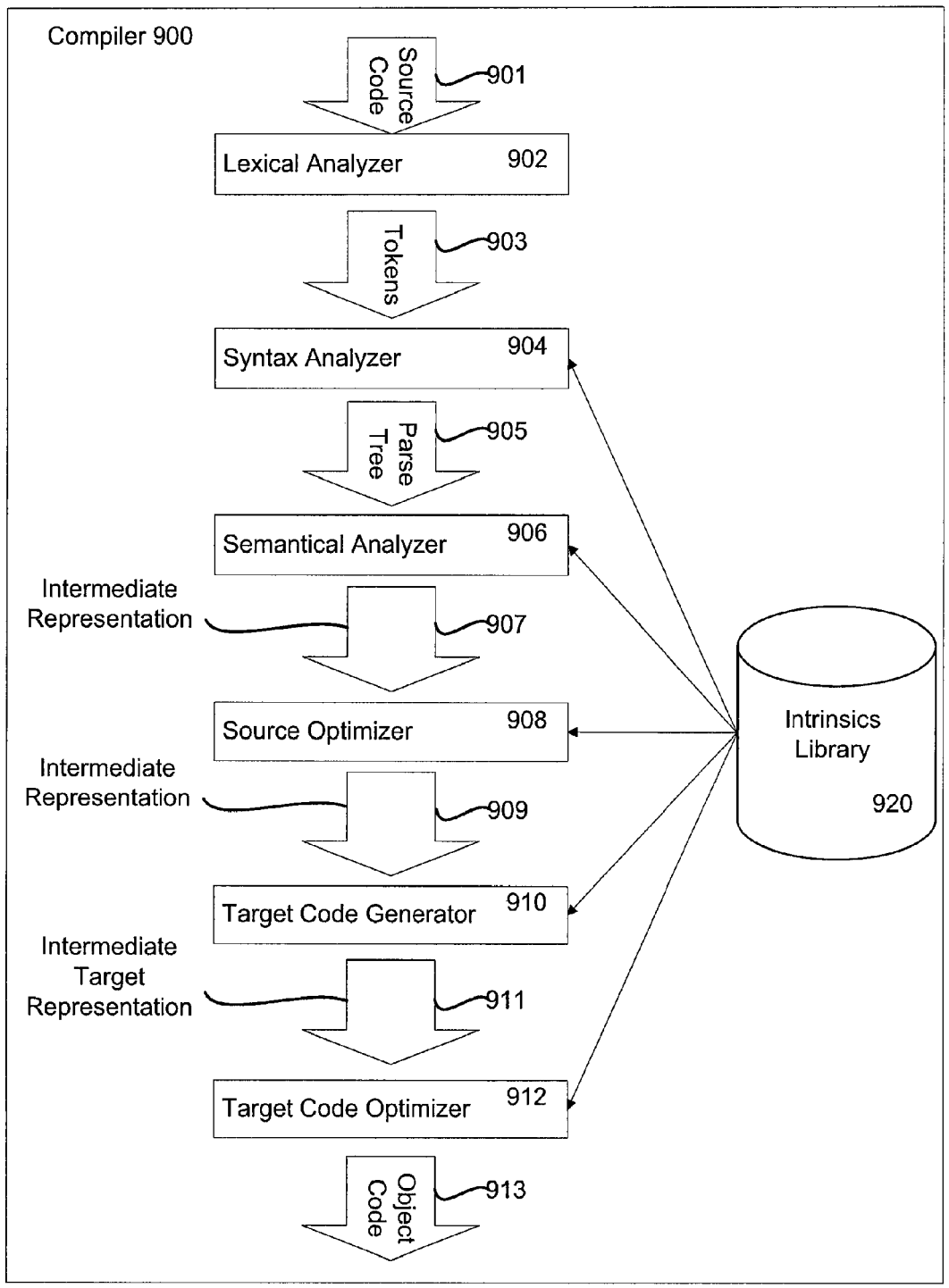
FIG. 9-A

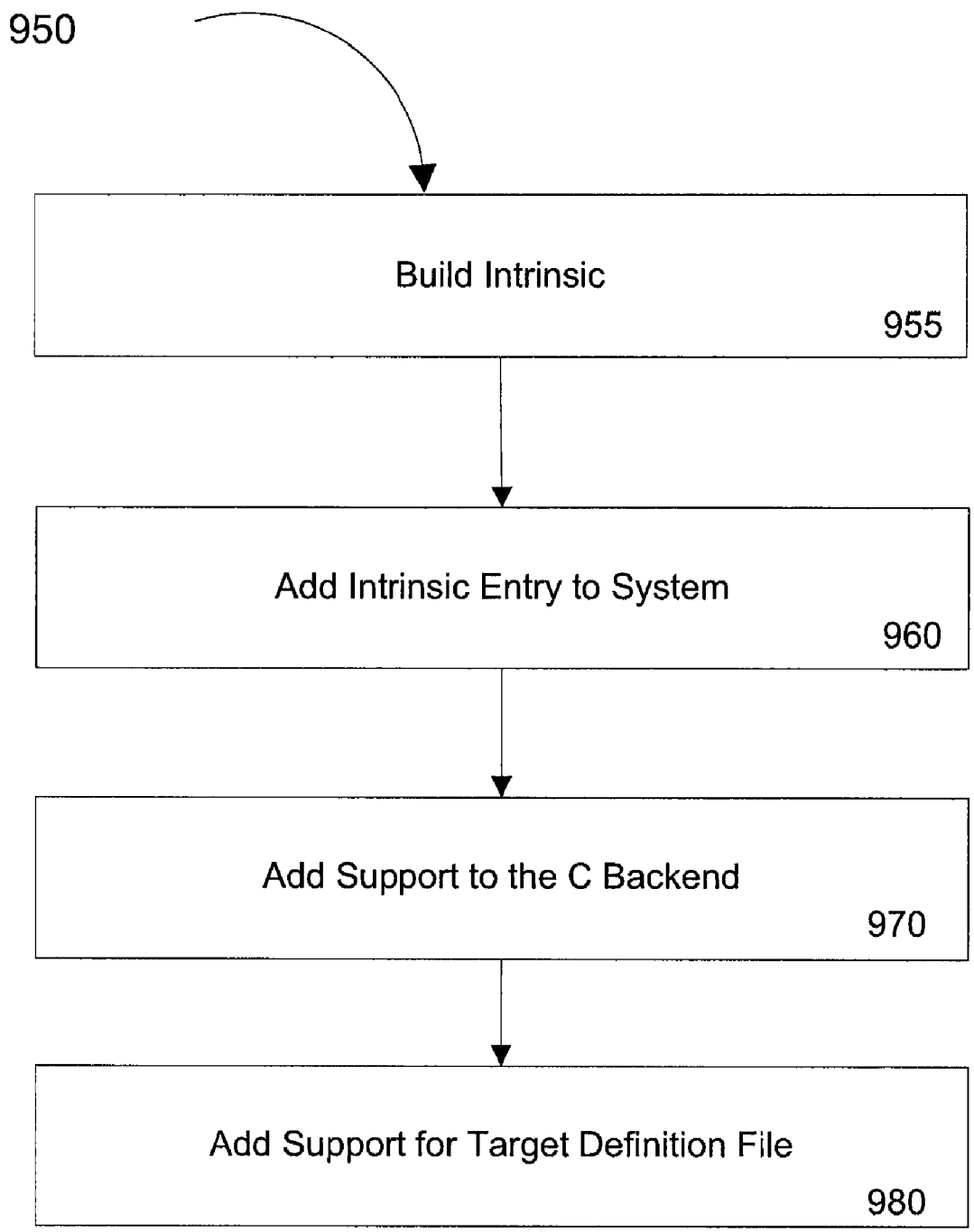
FIG. 9-B

COMPILING TECHNIQUES FOR PROVIDING LIMITED ACCURACY AND ENHANCED PERFORMANCE GRANULARITY

TECHNICAL FIELD

This subject matter relates to computer code compilers and methods of compiling.

BACKGROUND

In software development, source code is compiled into object code by a compiler. The object code can be linked with other object code and libraries to make an executable program that can be run on a computer. A mathematical function in the source code is implemented either in the source code or in the library. An example library is libm, a widely used math library. For a basic mathematical function (such as an exponential function, exp(x), or a logarithm function, log(x)), the conventional implementation is to define the math function in a standard math library. A standard math library, designed to support general applications, can be robust, accurate, and able to handle fringe situations and exceptions. Such requirements, however, dictate that the library be complex, and its routines resource-intensive.

Certain applications, such as MP3 players, are limited in the amount of computational expense they can incur. Such applications execute some mathematical functions a large number of times during typical operation. If the application were to use a common library implementation of the math functions (such as those in libm), the application would exceed its computational expense constraints. If the application were to use its own definitions of the functions, the portability of the source code across various platforms would be reduced.

SUMMARY

A programmable compiler detects from source code invocations of mathematical functions that require reduced levels of accuracy, limited domains, or enhanced execution speed. The programmable compiler replaces such invocations with intrinsics from the compiler's own library. The mathematical function invocations are thereby converted into inline object code. The inline object code can be subsequently optimized along with other code through normal compiler optimization. If an accuracy requirement is beyond what any compiler intrinsic can provide, the programmable compiler preserves the invocation of the math function defined in a default library.

The disclosed programmable compiler can be implemented to realize one or more of the following advantages. The disclosed programmable compiler saves resources by replacing full accuracy math functions with simpler routines. A math function in a default math library is robust, accurate, but requires more CPU cycles than necessary when the application requires only limited accuracy. The disclosed programmable compiler saves resources as well as reduces program complexity and maintenance cost by eliminating calls into libraries. In general, library calls have more overhead than inline code does, even when the libraries are customized and contain reduced accuracy functions. The overhead can be in the form of more CPU cycles. The disclosed programmable compiler increases code portability by permitting a programmer to write a general routine for all platforms, without requiring the programmer to possess knowledge of reduced accuracy function implementations. The programmer only needs to know what accuracy requirements are for a particular application or platform. The compiler transparently generates the object code. The disclosed programmable compiler enhances application performance by optimizing reduced accuracy routine code. The compiler can perform standard optimization on the object code for reduced accuracy routines, using inline code whenever economical.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2-A shows an approach to an inefficiency problem utilizing multiple versions of source code.

FIG. 2-B shows an approach to the inefficiency problem utilizing multiple libraries.

FIG. 9-A is a depiction of some examples on how intrinsic libraries work in a compiler.

FIG. 9-B is a flowchart illustrating a process to add a compiler intrinsic to a compiler intrinsic library.

Like reference symbols in the various drawings indicate like elements.

DETAILED DESCRIPTION

Figure 1:
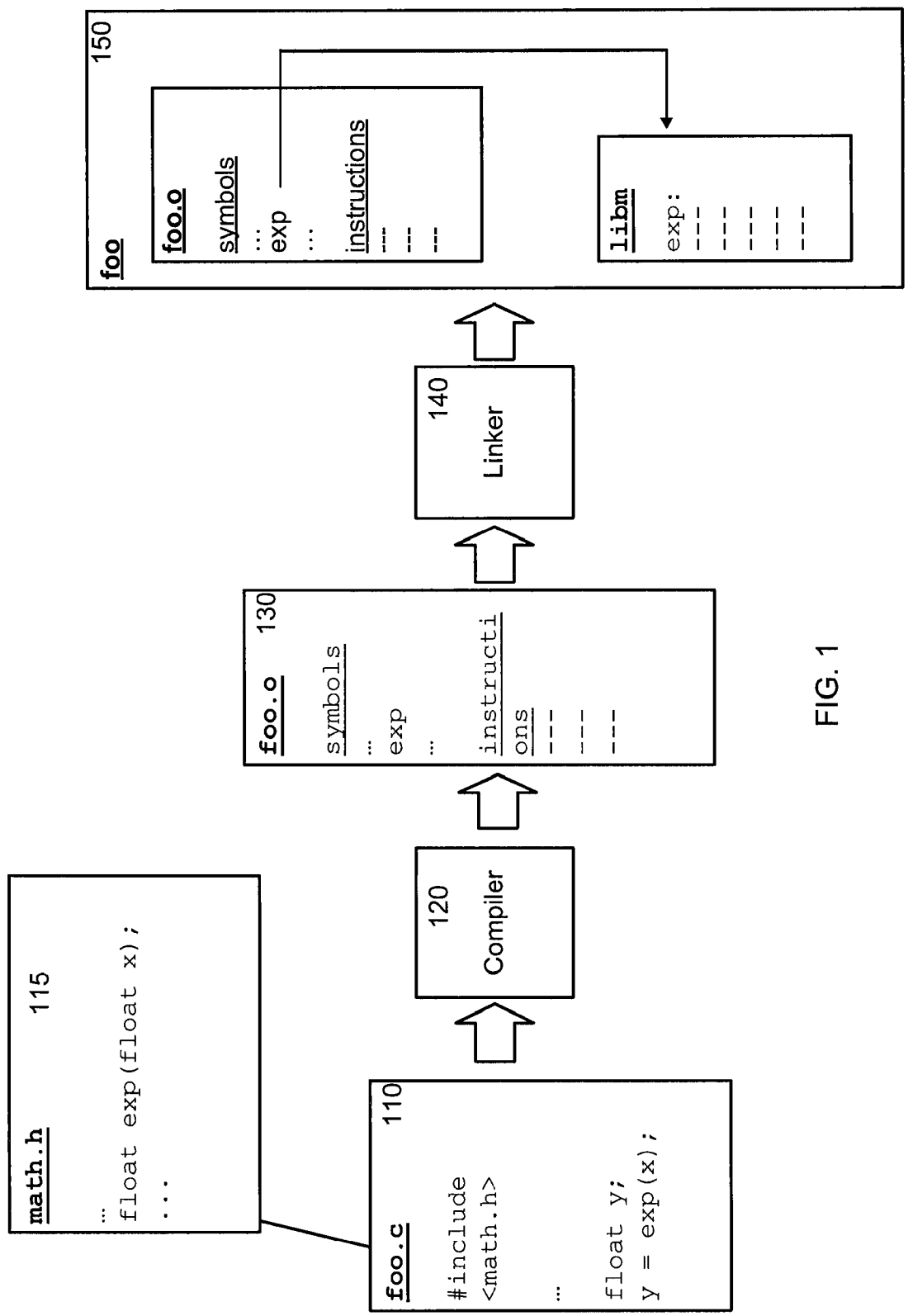
FIG. 1 illustrates a conventional function call into a default library.

FIG. 1 illustrates a conventional function call into a default library. A computer application begins its life as source code 110. The source code 110 is written in a computer language (the source language). A compiler 120 compiles, or translates, the source code 110 into object code 130 in a target language. Compilation can involve some or all of following steps: line reconstruction, lexical analysis, preprocessing, parsing, semantic analysis, code generation, and code optimization. The object code 130 is usually suitable for processing by other programs, e.g. a linker 140. A linker is a computer program that links one or more object code files together to generate an executable program 150 that can be run by a processor in a computer or other processing device. The linker 140 can also link into the executable program 150 one or more libraries, which can include pre-defined routines that can be shared by many applications.

In the example shown, source code 110 in source file foo.c is written in C programming language. The source code 110 includes an assignment statement, y=exp(x). The assignment statement invokes a math function exp. The symbol "exp" can be declared as a function in a header file 115 <math.h>. The math function exp is defined to calculate e to the power of x. The definition of function exp is in a default math library, such as libm.

Compiler 120 translates the source code 110 into object code 130. The object code 130 can have any desired file name, such as foo.o. The object code 130 contains a symbol table, which contains identifiers. An identifier can be a symbol undefined in the object code 130. This happens when the identifier is declared in one object file but defined in another object file or a library. A library can include routines which can be shared by many applications. In this example, the identifier "exp" contained in the symbol table in object code 130 is undefined because it is declared in the header file 115 (<math.h>) but not defined in the source code 110 (foo.c).

The linker 140 processes the object code 130 and supporting libraries. Generally, a linker is a computer program that resolves symbols in object files, and assembles object files and libraries into a single executable program. In this example, when linking the object file foo.o and a library file libm together, the linker 140 resolves the identifier "exp" to a subroutine in the library libm for performing the exp function. In the single executable program 150, the identifier "exp" points to the exp routine in libm. Note the routine exp in libm is accurate, robust and complex, to the degree permitted by the CPU and operating system, because it is in a library that was designed to be shared by many applications. For example, the ISO/IEC 9899:1999 standard for C programming language (commonly known as C99 standard) governs what a function has to do at what particular instances. It gives accuracy recommendations or requirements and prescribes what the function should do when an argument for the function is an abnormal value. Therefore, a call to the exp(x) routine in libm can be inefficient if the accuracy of the exp(x) routine exceeds the accuracy requirement of the call, or when the exp(x) function argument, x, is already guaranteed not to be an abnormal value. The inefficiency is a problem when an application makes many such function calls but is constrained in resources.

FIG. 2-A shows an approach to an inefficiency problem utilizing multiple versions of source code. Assume an application requires lesser accuracy, makes many calls and can only incur limited resources. Examples of such an application are an MP3 player (for playing MPEG-1 Audio Layer 3 format digital files), an Advanced Audio Coding (AAC) application, a Core Imaging application, or a Core Video application.

Instead of writing a standard function call to the libm in applications, a programmer can define a reduced accuracy function in the applications. For example, the programmer can write a function exp_limit_8(x) 202 to calculate the exponential value of the argument x, with six bits of accuracy, instead of a full 23-bit accuracy function provided by the libm library and operating system. It should be noted that the term "23-bit accuracy" is also known as implicit 24-bit accuracy because the first bit of a normalized binary fraction is always 1. The function exp_limit_8(x) can be defined in a source file, or a header file. The function can be defined as a non-inline function, as parameterized macros, or as true inline functions as in GNU C or C99. In this example, exp_limit_8 is defined in the source code without an inline directive. A general compiler 230, such as publicly available Open Source compilers Gnu Compiler Collection (GCC) or an Low Level Virtual Machine (LLVM) compiler, compiles the source code into an executable program. Similarly, the programmer can define 12-bit and 16-bit functions such as exp_limit_12( ) 204, and exp_limit_16( ) 206. Because the functions exp_limit_8( ) 202, exp_limit_12( ) 204, and exp_limit_16( ) 206 are defined in the source code, the linker 240 can resolve the symbols without resorting to a default general library, such as libm. If a standard function call requires full accuracy 208, the standard libm can be used. The corresponding applications 252, 254, and 256 are therefore optimized for their particular accuracy requirement. Application 258 preserves full accuracy.

The approach illustrated in FIG. 2-A requires a programmer to write a specific implementation in the source code 202, 204, or 206 for each mathematical function and for each platform, because the accuracy requirements on various platforms may differ. Each implementation can be in a separate version of the software. The versions of the same application are kept in sync if the programmer decides to change the invocation of the underlying mathematically function. Therefore, the maintenance of various versions of source code for various applications or platforms can be expensive under this solution.

FIG. 2-B shows an approach to the inefficiency problem utilizing multiple libraries. A programmer links in a reduced accuracy math library specific to each platform. The programmer writes one version of source code 212 (foo.c). A conventional compiler 232 compiles the source code 212 into object code file foo.o on a variety of platforms, or for particular applications. In this example, platform 262 requires 6-bit accuracy, platform 264 requires 12-bit accuracy, platform 266 requires 18-bit accuracy, and platform 268 requires full 23-bit accuracy. A linker 242 links the object code foo.o with a reduced accuracy library that is particular to each platform. The linker 242 knows which library to link in on each platform, because the link parameters can specifically indicate the names of the libraries to use. The reduced accuracy libraries each has its specific name, e.g., libm_8, libm_12, and libm_16. Platform 258 requires full accuracy, therefore the linker 242 on platform 268 links object code file foo.o with the default libm library.

The approach in FIG. 2-B has several disadvantages. Various platforms can require multiple implementations of math libraries for a single application. For example, one platform can require a library for 8-bit accuracy, another platform can require a library for 12-bit accuracy, and yet another platform can require a library for 16-bit accuracy. Another disadvantage is that the application program still makes a library calls. As is commonly known, library calls involve overhead. Furthermore, another disadvantage is that the optimization is performed at linking time, not compile time. Generally, a compiler, rather than linker, is the best place to perform optimization. For these reasons, it is difficult for a library call to achieve the same level of performance as in compiler generated inline code.

In the following implementations, the examples are given in C programming language. However, the implementation of functions with limited accuracy and domain by compiler intrinsics is not limited to C language. Any computer language that permits the use of compilers, libraries, and linkers is suitable for some or all of these implementations.

Figure 3:
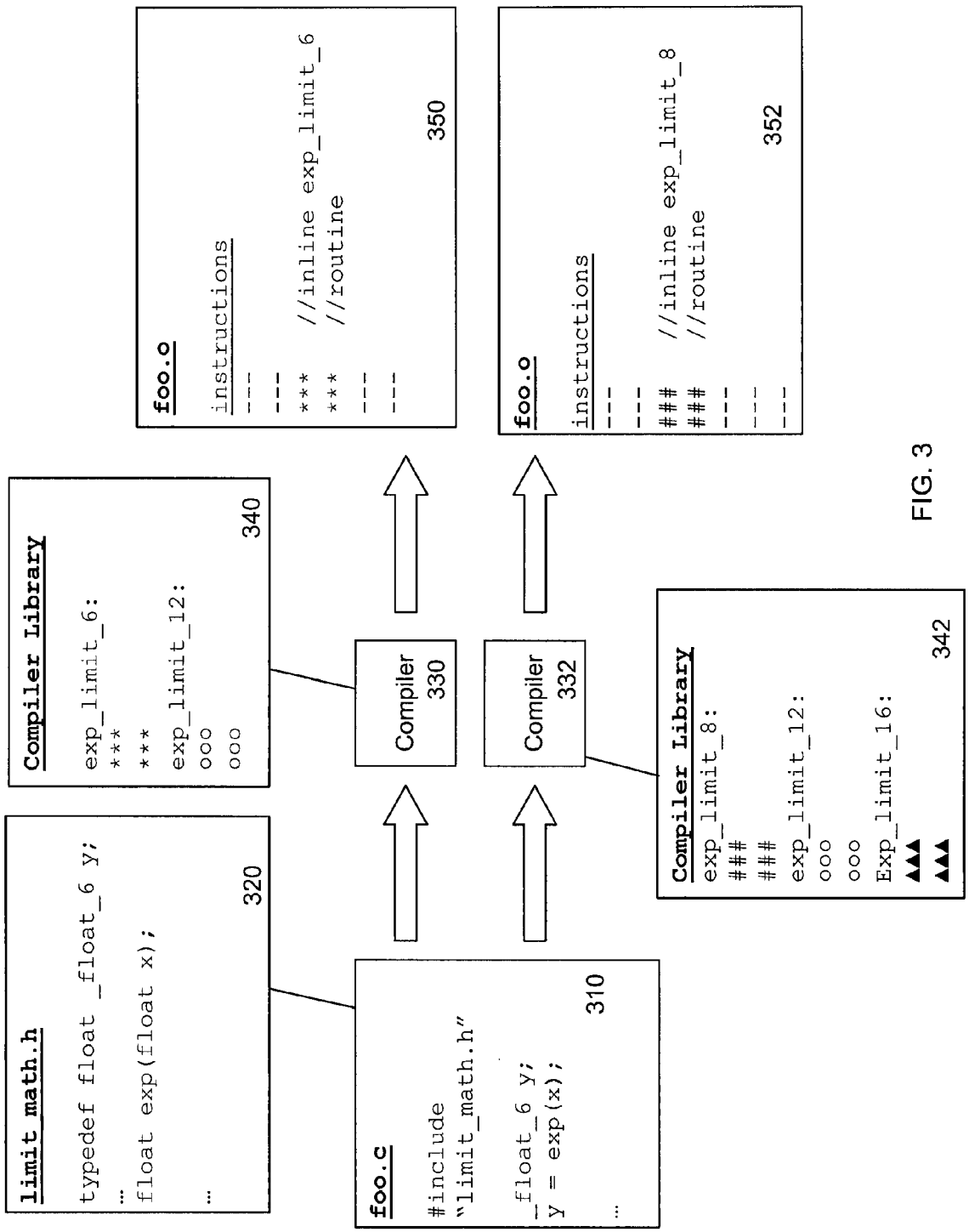
FIG. 3 shows one example implementation of the enhanced programmable compiler, utilizing a customized type definition.

FIG. 3 shows one example implementation of an enhanced programmable compiler, utilizing a customized type definition. In this implementation, the accuracy of a mathematical function is limited by a number of bits in a binary number system. In other implementations, the accuracy can be limited by, for example, decimal, octal, or hexadecimal digits. As an example, and for illustrative purpose only, assume an application requires 6-bit accuracy from the result of an exp function. In source code file 310 (foo.c), an assignment statement gives the value exp(x) to y. The return type of the function exp( ) is float, indicating that exp( ) returns a single precision floating point number. The data type of y is _float_6. The declaration "_float_6 y;" may be in a source file 310 or a header file 320. _float_6 is not a standard C language data type. One way to allow the compiler to recognize _float_6 is through the typedef keyword in the header file 320. Another way is to make _float_6 an intrinsic type in the compiler, such as a derived type from float. An intrinsic type is a type built into the compiler. Either way, the type _float_6 has an underlying data type of float. A conventional compiler does not understand any special meaning in _float_6. It simply gives its underlying data type float to y. In contrast, to a programmable compiler 330 or 332, _float_6 has predefined special meaning. The type _float_6 indicates that any assignment to an l-value in this type requires only 6-bit accuracy. Therefore, a programmer using the programmable compiler need not know the actual routine for calculating an exp function with 6-bit accuracy. The programmer need only know that he requires 6-bit accuracy in a particular application or on a particular platform.

The programmable compiler 330 compiles the source code 310. When the programmable compiler parses the source code 310, the compiler encounters assignment statement y=exp(x). In an assignment statement, the type of r-value, or the expression on the right of the equal sign (here, exp(x), whose value cannot be assigned, matches the type of l-value, the variable on the left (here, y), whose value can be assigned. If the types do not match, the compiler performs an assignment conversion, also known as implicit data type conversion, to convert the type of the expression to the type of the variable.

A conventional compiler obtains metadata of a function from the function itself. Metadata of a function can include the function type, parameter type, whether the function is abstract, whether the function should be inlined, etc. In a conventional compiler, no assignment conversion is necessary for source code 310, because on both sides of the assignment, the data type is float. In contrast, the programmable compiler can have extra information in the metadata because it knows from data type _float_6 of the l-value that the source code is attempting to use a reduced accuracy routine if possible, and that the reduced accuracy is 6 bits.

As the programmable compiler 330 recognizes the limited accuracy requirement, the compiler invokes a modified routine for assignment conversion. This modified routine injects the limited accuracy function call into the object code. Programmable compiler 330 contains a library 340. Library 340 can be a compiler intrinsic library. A compiler intrinsic is a function built into the compiler. A compiler intrinsic library is a collection of such functions. Library 340 can be inline in the compiler, statically linked to the compiler 330, or dynamically linked to the compiler 330. Library 340 contains routines for reduced accuracy math functions, such as exp or log. In this example, the programmable compiler 330 finds an instruction set exp_limit_6( ) in its intrinsic library 340, which is the routine whose accuracy rating matches the 6-bit accuracy requirement from the l-value.

After finding exp_limit_6( ) as a matching intrinsic, the programmable compiler 340 injects intrinsic exp_limit_6( ), performs conventional optimization, and generates object code 350. In object code 350, the invocation of function exp is replaced with machine instructions based on the exp_limit_6 intrinsic in the programmable compiler library 340. The exp_limit_6 routine is less complex and requires fewer CPU cycles than the standard function exp as defined in the default library, by virtue of its limited accuracy, or limited argument domain, or limited error handling capability, or limited exception handling capability, or a combination of any or all these factors. The machine instructions injected into object code 350 can be more efficient also because the optimization can make the machine instructions inline.

An exact match between the required accuracy and the reduced accuracy intrinsics may not exist. In the following example, compiler 332 uses a reduced accuracy intrinsic library 342, which contains routines with 8-bit, 12-bit, and 16-bit accuracy, but not 6-bit accuracy as required by the l-value. If the compiler 332 cannot find the function with the exact matching accuracy in its intrinsic library 342, the compiler 332 uses the intrinsic with the next higher level of accuracy. For example, if 6-bit accuracy is required but no 6-bit accurate exp routine exists in the intrinsic library, the programmable compiler 332 seeks 8-bit, 12-bit, and 18-bit accurate routines. If all are available, the compiler uses a 8-bit accurate function, the function with a lowest sufficient accuracy. The compiler 332 then generates object code 352, which contains the exp limit 8 routine.

Conventional optimization on object code 350 or 352 can include a decision by the programmable compiler 330 or 332 whether to inline the limited accuracy calculation routine, based on the characteristics of the object code. When a function is called many times, the compiler, or linker, or some other mechanism can decide to put the actual code of the called function inside the routine which calls it. This is commonly known as inlining. Inlining can be done with static libraries easily, and there can be tremendous performance gained by inlining. In general, a compiler knows the particularities of the platform or the CPU the best, and therefore is best suited to perform optimization and determine whether to inline a function. A programmable compiler 330 or 332 can determine to inline the exp_limit_6 or exp_limit_8 routines under most conditions. However, it is possible that under certain conditions, the programmable compiler 330 preserves the function invocation, except the programmable compiler 330 substitutes the actual function exp with exp_limit_6 or exp_limit_8.

Figure 4:
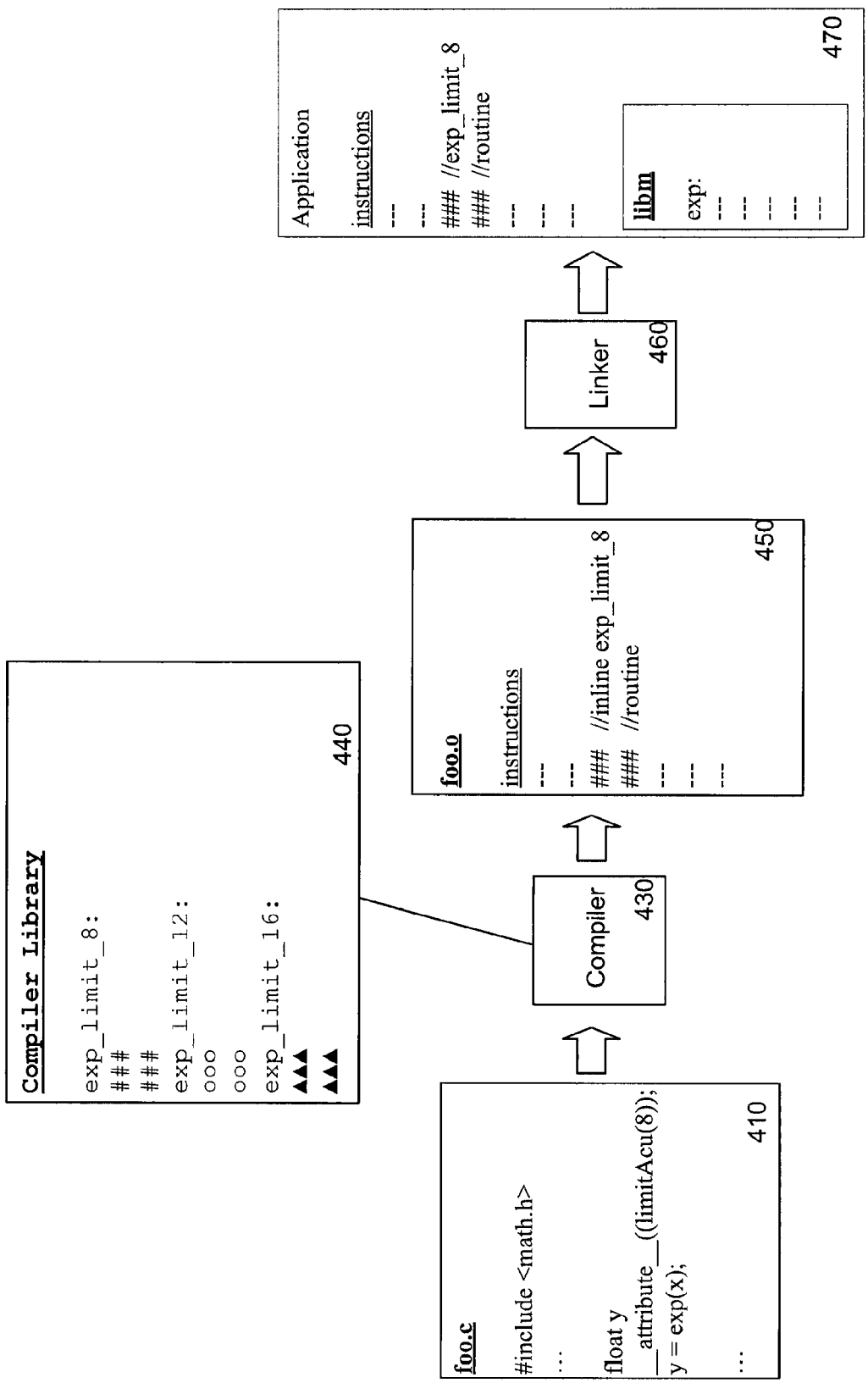
FIG. 4 shows another example implementation of the enhanced programmable compiler, utilizing variable attributes.

FIG. 4 shows another example implementation of the programmable compiler, utilizing variable attributes. In certain compilers for C, such as GCC or LLVM C compiler, the _attribute_keyword can be used to specify special attributes of variables, structure fields, types, or functions. The _attribute_keyword is followed by an attribute specification inside double parentheses. In this implementation, as an example, and for illustrative purpose only, assume the application requires 8-bit accuracy from the result of the exp function. In source code 410, variable y is declared as a floating point variable by keyword float. Further, variable y has an associated attribute, limitedAccuracy ((8)).

The programmable compiler 430 compiles the source code 410. When the programmable compiler encounters attribute limitedAccuracy((8)), the compiler takes notice that variable y has an accuracy requirement of 8 bits. The compiler records this requirement internally, for example, by setting a flag. In comparison, a conventional compiler ignores this attribute.

The programmable compiler 430 continues to parse the source code. It encounters the assignment statement y=exp(x) in source code 410. The programmable compiler extracts metadata of the function exp. No assignment conversion is necessary because the type of l-value (y) and the type of r-value exp(x) are both float. However, the programmable compiler still performs a routine based on the internal record, e.g., the flag, on variable y. The compiler 430 has an internal library 440, which contains limited accuracy calculation routines. The programmable compiler finds a matching routine in the internal library 440, exp_limit_8, and subsequently injects this routine into the object code 450. The object code is optimized and linked into an executable.

The linker 460 assembles object code 450 with other object code files, if any, and libraries, if necessary, to create an executable application program 470. The linker 460 can still link a default library such as libm into application 470, if there are other function calls into the default library. However, the invocation of function exp(x) no longer involves a call to the default library, because the routines in the compiler libraries 440 for calculating exponentials with reduced requirement of accuracy replaced the exp function call. The new routines are less complex and requires fewer CPU cycles than the one in the standard library. Therefore, the resulting application 470 is more efficient during execution than an executable generated by a standard compiler.

Figure 5:
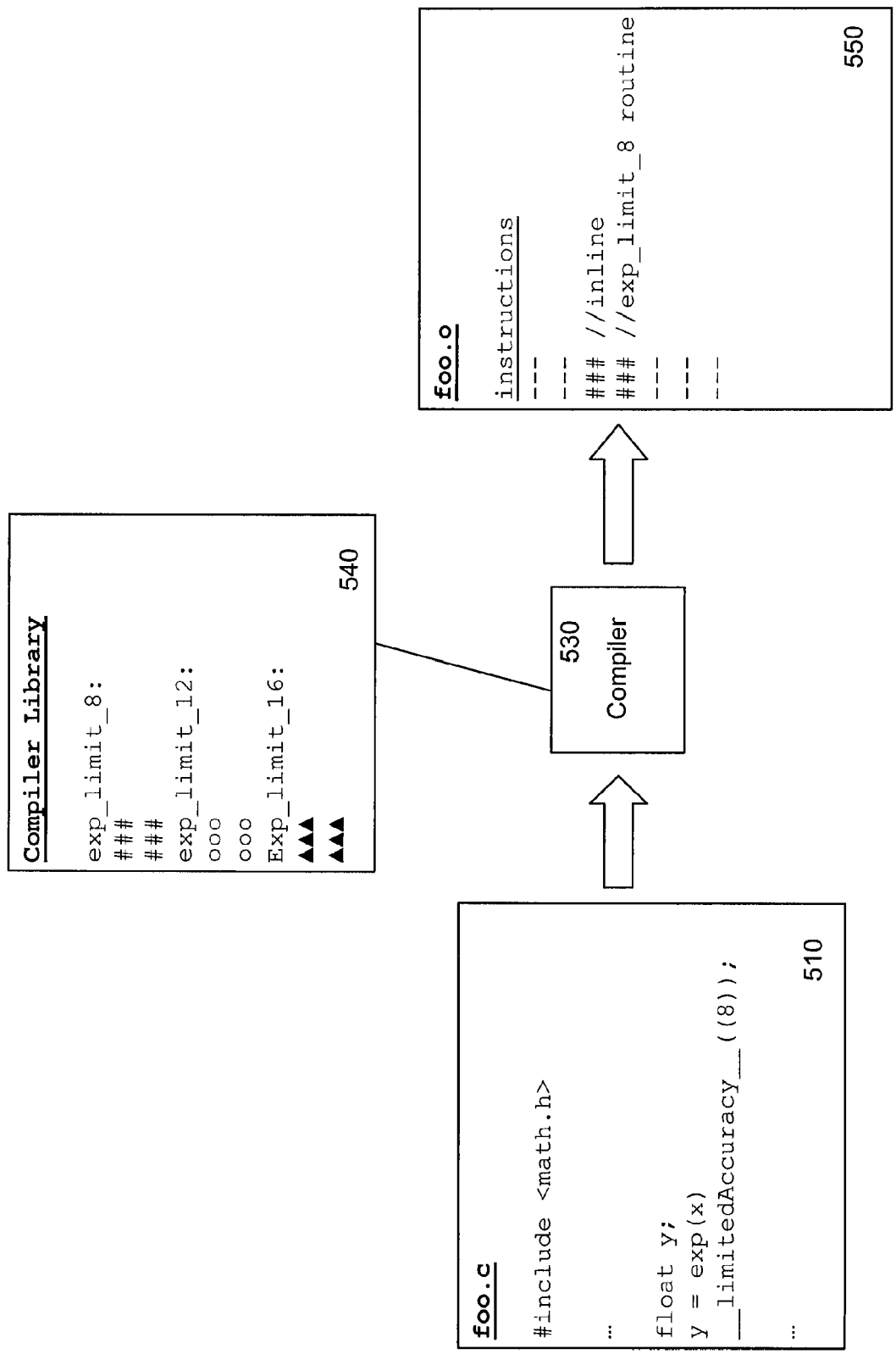
FIG. 5 shows another example implementation of the enhanced programmable compiler, using function decoration.

FIG. 5 shows another example implementation of the programmable compiler, using function decoration. Referring to source code 510, function exp(x) is decorated with _limitedAccuracy_((8)). When the programmable compiler 530 encounters the assignment statement y=exp(x)_limitedAccuracy_((8)), the compiler recognizes that r-value, the function exp(x), requires limited accuracy of 8-bits, based on the function decoration _limitedAccuracy_((8)). The programmable compiler selects a corresponding subroutine in the compiler's intrinsic library 540, and replaces the function call with the corresponding subroutine to generate object code 550.

Figure 6:
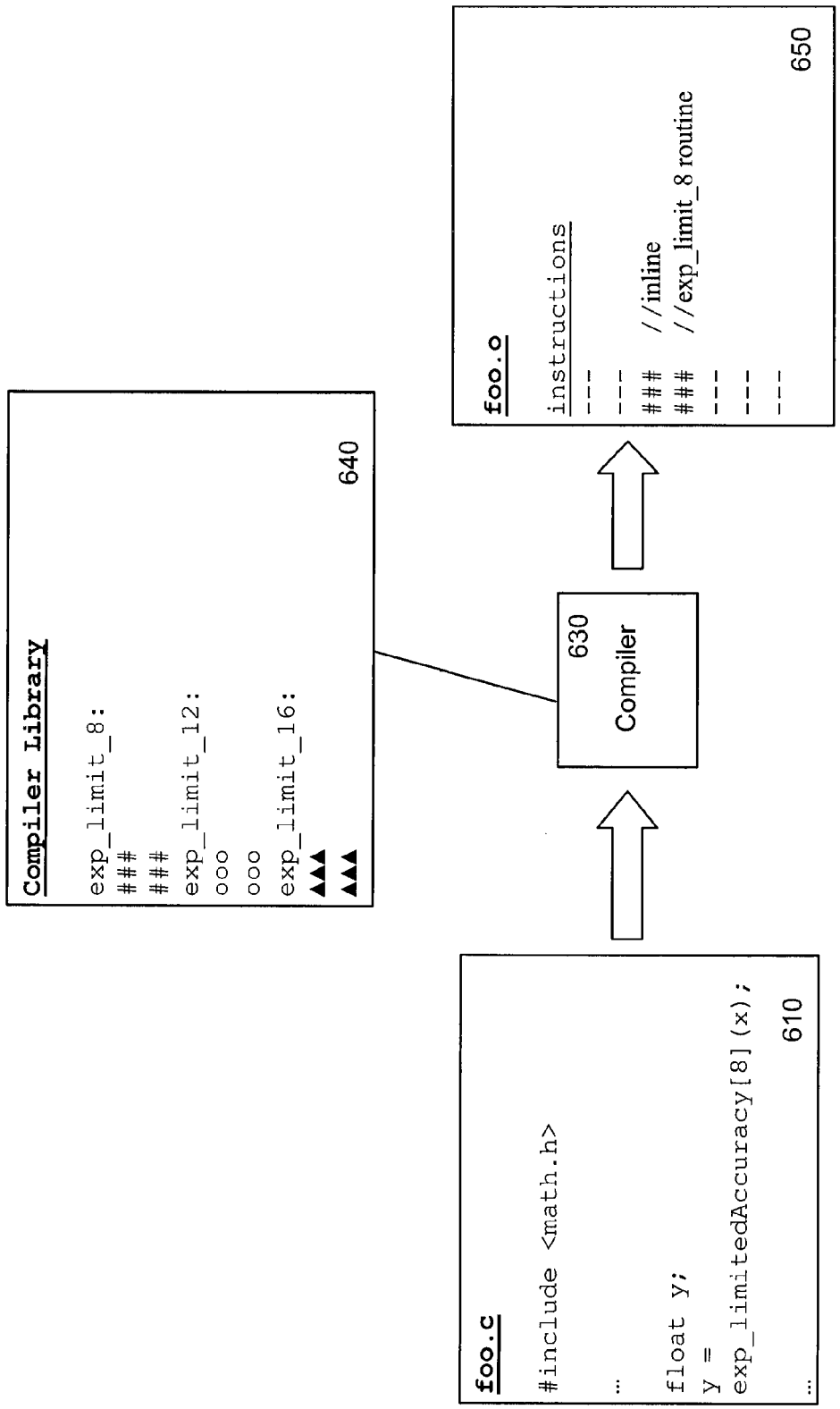
FIG. 6 shows another example implementation of the enhanced programmable compiler, using function subscripting abuse.

FIG. 6 shows another example implementation of the enhanced programmable compiler, using function subscripting abuse. C-like programming languages, such as C, C++, or D, support function pointers and function arrays. Therefore, notions such as float y=exp_limitedAccuracy[8](x) in source code 610 is semantically valid for a conventional compiler. Normally, when a compiler sees this, the compiler emits code that executes a function located by a function pointer. However, in this embodiment, the programmable compiler 630 understands that exp_limitedAccuracy[8](x) means the compiler should generate object code for exp, with accuracy limited to 8 bits. Subsequently, the programmable compiler locates a corresponding routine exp_limit_8 in its internal library 640, and injects this routine into object code 650.

Figure 7:
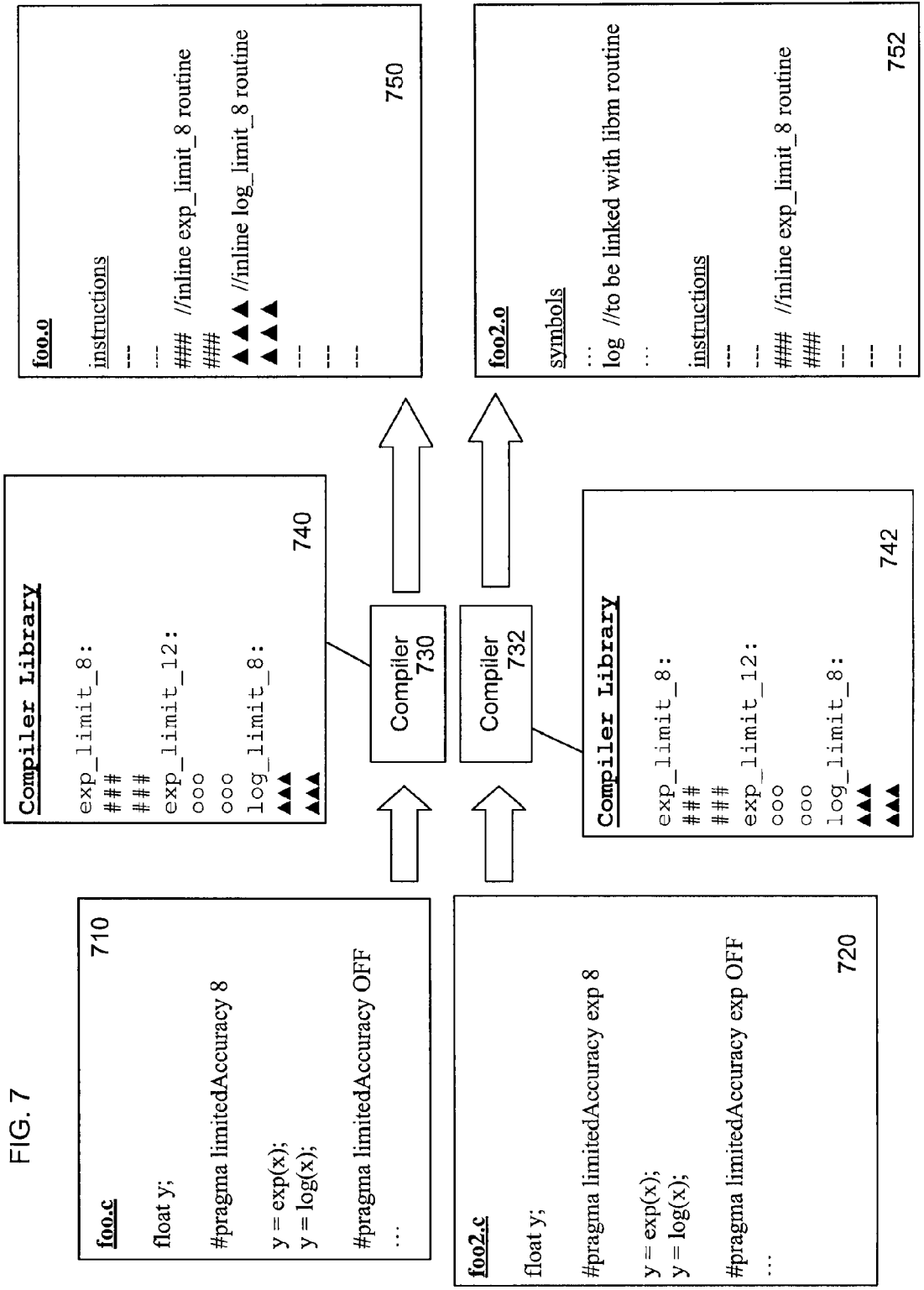
FIG. 7 shows another example implementation of the enhanced programmable compiler, using compiler directives.

FIG. 7 shows another example implementation of the enhanced programmable compiler, using compiler directives. Generally, compiler directives are constructs that tell a compiler how to process input. Examples of such directives are "pragma" in C/C++ family languages, significant comment in some implementation of Pascal language, or "use" in Perl. Referring to source code 710, as an example, and for illustrative purpose only, source code 710 is written in C programming language. The line #pragma limitedAccuracy 8 is a directive that tells the programmable compiler that from the occurrence of this pragma onward, all functions have limited accuracy requirement of 8 bits. Pragma directives can alternatively tell the compiler that functions have limited accuracy requirement of 6 bits, 12 bits, 16 bits and so on, in similar format. The limited accuracy requirement ends at line #pragma limitedAccuracy OFF. In other words, in source code 710, a pair of pragmas define the scope in which limited accuracy routines apply.

In source code 710, for illustrative purpose only, two mathematical functions, exp(x) and log(x), are invoked between the pair of pragmas. Once the programmable compiler 730 encounters the first pragma, the programmable compiler 730 registers that limited accuracy requirements apply. When the programmable compiler 730 subsequently reaches the function invocations, the compiler attempts to locate routines for exp and log functions with 8-bit accuracy in the intrinsic library 740. In this example, the routines exp_limit_8 and log_limit_8 exist in the intrinsic library 740. The compiler 730 injects these routines into object code 750. It should be noted that the programmable compiler treats all mathematical functions within the two pragmas as functions requiring reduced accuracy, and replaces them with corresponding intrinsic routines when possible, because the pragma is not targeting any specific mathematical function. After encountering the second pragma, the compiler 730 ceases replacing mathematical function invocations with reduced accuracy routines.

Referring to source code 720, the line #pragma limitedAccuracy exp 8 tells the compiler that from the occurrence of the pragma, all exp functions, but no other functions, have limited accuracy requirement of 8 bits. Pragma directives can alternatively tell the compiler that functions have limited accuracy requirement of 6 bits, 12 bits, 16 bits and so on, in similar format. The limited accuracy requirement ends at the line #pragma limitedAccuracy OFF.

In this example, for illustrative purpose only, two mathematical functions exp(x) and log(x) are invoked by assignment statements within the two pragmas. Once the programmable compiler 732 encounters the first pragma, the compiler 732 registers that limited accuracy routines for exp function apply. When the programmable compiler 732 subsequently reaches invocation of function exp, the compiler locates routines suitable for an 8-bit accurate exp in the intrinsic library 742. In this example, the compiler 732 injects the routine exp_limit_8 into object code 752. It should be noted that the programmable compiler uses intrinsics only for exp function invocations within the two pragmas, because the pragma is targeting exp functions only. After encountering the second pragma, the compiler 732 ceases replacing mathematical function invocations with reduced accuracy routines. Other calls to exp(x), if outside the pragma pair, and calls to function log(x), whether or not inside the pragma pair, remain function calls into a default math library, e.g., libm.

The implementation in FIG. 7 is beneficial because it allows conventional compilers to compile source code 710 and 720. In many computer language definitions, compiler directives are not mandatory. Therefore, a compiler discards a directive if it cannot recognize it. A conventional compiler simply ignores the #pragma limitedAccuracy directives. As a result, source code 710 and 720 can work on more than one platforms.

Other implementations of the programmable compiler are possible. For example, one implementation is to call the limited accuracy routines directly by intrinsic name. Entry points to 8-, 12-, 16-, and 20-bit accuracy routines are aliases to actual intrinsic routines, if they are not inlined. The compiler can provide an entry point and prototype for some or all possible accuracy ranges and for some or all mathematical functions. The following is an illustration of this implementation:

```
#include <limitedAccuracyMath.h>
float y = exp_limitedAccuracy8(x);
```

Another implementation is to call the limited accuracy routines directly by intrinsic name, but limiting the number of entry points by requiring one or more extra function arguments. The following is an illustration of this implementation:

```
#include <limitedAccuracyMath.h>
float y = exp_limitedAccuracy(x, 8);
```

The programmable compiler referred to above can be implemented in any commercially available compiler or Open Source compiler, such as LLVM-GCC, GCC, Tiny C Compiler for C and C++, GNU Pascal and Turbo Pascal for Pascal, and LLVM and Polaris for FORTRAN. After translating source code into object code, the compiler can perform optimization on the object code generated, such that the efficiency of the execution of instructions in the object code is maximized. The object code and completed application can be stored on a computer-readable medium, such as random access memory (RAM), a flash drive, or a hard disk drive.

Figure 8:
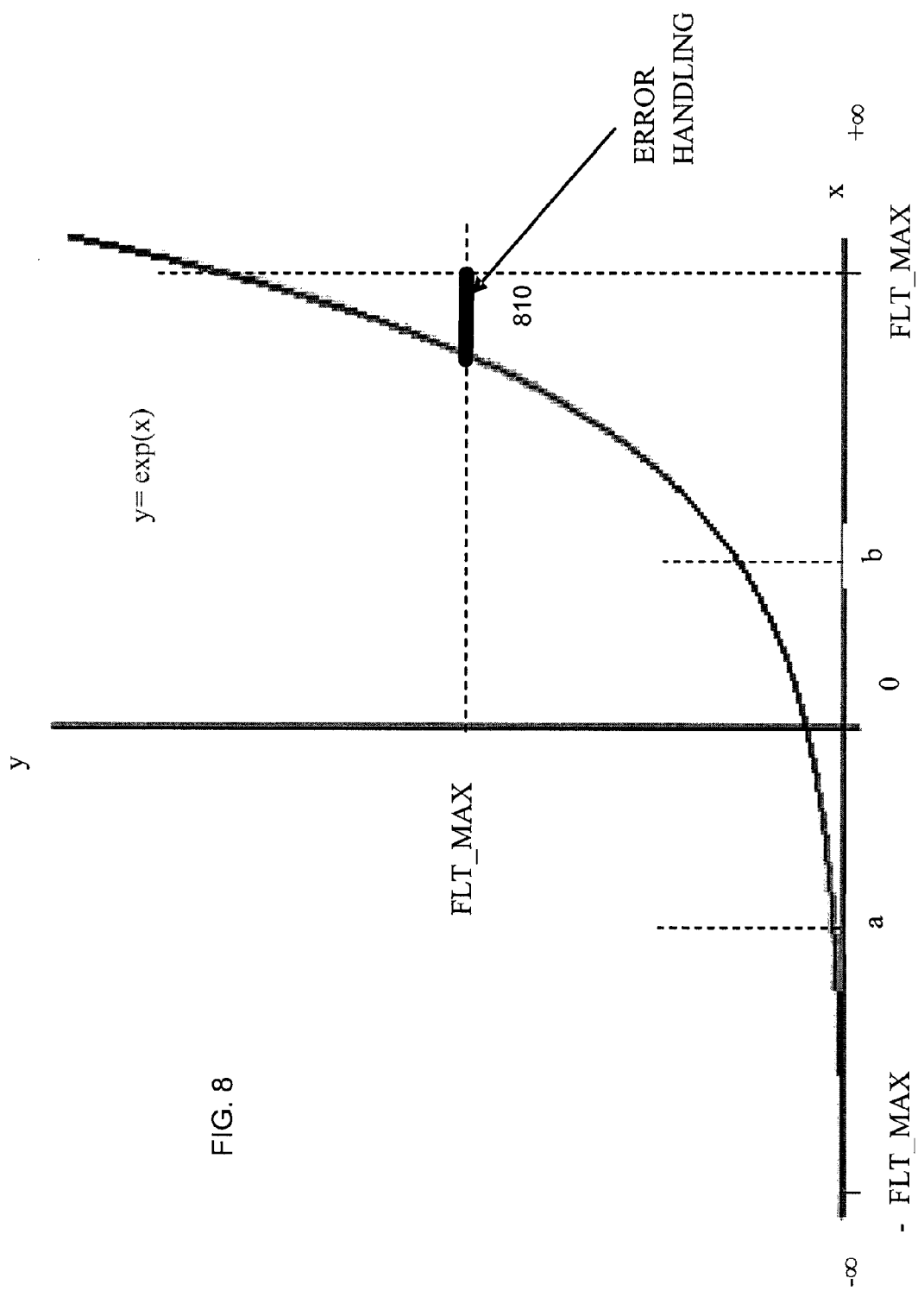
FIG. 8 illustrates the concept of domain and accuracy limitation.

FIG. 8 illustrates the concept of domain and accuracy limitation. For illustration purposes, an exponential function $y=e^x$ implemented in single-precision floating point arithmetic (IEEE-754) is shown. In various parts of FIG. 8, reduced accuracy routines can be utilized to reduce overhead.

For example, reduced argument domain can lead to reduced amount of error handling. In theory, the domain of variable x can be $(-\infty, +\infty)$, and the range of value y is $(0, +\infty)$. Realistically, in a default implementation in a general math library on a computer, the domain is limited by the minimum and maximum floating point number that can be represented by the architecture of the computer, the operating system, or the standard math library itself. As an example, in some implementations, a macro or constant FLT_MAX represents the largest floating point number that can be represented. FLT_MAX can have a value of, for example, 3.4E38 ($3.4 \times 10^{38}$) under IEEE-754. Therefore, the domain for variable x is as wide as [<3.4E38, 3.4E38], exceeding the need of many applications.

Comprehensive error handling is necessary in a general purpose default math library. For example, overflow handling 810 is required in a general purpose default math library, because if x is within the area 810 (log(FLT_MAX), FLT MAX], the value of y will exceed the FLT_MAX 810 that can be represented by the operating system. A standard library incurs a cost in overflow handling.

However, under certain conditions, an application need not go through a complex implementation in a standard library. Referring to the graph shown in FIG. 8, for illustration purpose only, suppose for x in [a, b], a simpler method of calculating $e^x$ can be implemented, which takes fewer CPU cycles to execute. In such situations, if the application guarantees that the variable of the function cannot exceed [a, b], then the calculation can be simplified, because, for example, error handling 810 will not be necessary. The preferred implementation is to perform the simplified calculation, instead of invoking the default library call.

Similarly, a reduced precision requirement may lead to a reduced resource consumption. For illustration purposes only, assume the standard floating point number has a 32 bit representation on a system. Such a floating point number may have a one-bit sign section, an eight-bit exponent section, and a 23-bit fraction section, under IEEE-754. A calculation performed on this number therefore can have 23-bit accuracy for general purpose use. Assume that a certain application requires only 6-bit precision. A non-standard routine will be a preferred method to calculate the exponential function $e^x$ if it takes fewer CPU cycles to complete.

FIG. 9-A is a depiction of some examples on how intrinsic libraries work in a compiler. Compiler 900 is a compiler that supports intrinsic libraries. In this example, compiler 900 is a compiler for C programming language. It is understood that compilers for C++, FORTRAN, Pascal, or other languages may be used to support intrinsic libraries.

Compiler 900 reads source code 901, and feeds source code 901 into a lexical analyzer 902, also commonly known as a scanner. The lexical analyzer 902 breaks source code 901 into tokens 903. A token is a small, atomic unit of a language, such as a keyword, an identifier, or a symbol name.

A syntax analyzer 904, also commonly known as a parser, parses the tokens 903 to identify the syntactic structure of the program. The syntax analyzer 904 transforms the tokens 903 from a linear structure to a tree structure, which is commonly known as a parse tree. A parse tree is a connected acyclic simple graph. A parse tree is made of nodes and branches, representing values, operators, or evaluative methods. During parsing, the syntax analyzer 904 analyzes whether or not some sequences of tokens 903 conform to grammatical rules that define one or more intrinsic functions in an intrinsic library 920.

One example implementation of a programmable compiler is to use a flag as a rule in the syntax analyzer 904 to specify that reduced accuracy intrinsics should be used when the syntax analyzer encounters certain tokens. The flag can be passed to the compiler in the form of one or more command-line parameters or one or more make file switches when the compiler is invoked. When the compiler encounters a token, e.g., exp, when the flag is set, the compiler can perform a node swap. A node swap replaces a node or a subtree in the parse tree with another node or a subtree. In this example, the compiler replaces the node in the parse tree 905 which represents the token "exp" or the subtree that represents "exp(x)" with a new subtree that represents a routine in the intrinsic library that calculates exponential function with reduced precision.

A semantic analyzer 906 adds semantic information to the parse tree 905. The semantic analyzer 906 may perform type checking and object binding, among other operations. Type checking can involve comparing a type in parse tree 905 with a standard type or an intrinsic type defined in the intrinsic library 920. Object binding can involve associating variable and function references with variable and function definitions. A function definition can be in the intrinsic library 920. The semantic analyzer creates intermediate representation 907 of the program. One example implementation of a programmable compiler can be performing one or more node swaps based on a flag setting or a result of type checking at semantic analysis stage.

A source optimizer 908 performs one or more passes of optimization on the intermediate representation 907. Source optimizer 908 modifies the intermediate representation 907 to improve the efficiency of actual processing. When source optimizer 908 recognizes that one or more particular machine instructions in the intermediate representation 907 are from the intrinsic library 920, source optimizer 908 can use specific and detailed optimization instructions associated with that intrinsic to optimize the intermediate representation 907. The result is another set of intermediate representation 909. One example implementation of a programmable compiler can be swapping one or more node or subtrees in an intermediate representation 907 with one or more other nodes or subtrees that represent one or more reduced accuracy intrinsics based on flag settings to generate intermediate representation 909 at optimization stage.

A target code generator 910 translates the optimized intermediate representation 909 into intermediate target representation 911. Target code optimizer 912 performs one or more passes of optimization on intermediate target representation 911, to generate object code 913. Both intermediate target representation 911 and object code 913 can contain machine instructions from the intrinsics in the intrinsic library 920. Object code 913 is written in a target language, such as machine instructions. Object code 913 can be stored as a file on a computer readable medium.

The intrinsic library 920 contains a collection of one or more intrinsics. The intrinsic library 920 can be one or more files stored on a computer readable medium, one or more data structure built internally into the compiler 900, one or more libraries dynamically linked into compiler 900 at compile time, or one or more records in a database. The intrinsic library 920 may also be in any other form from which the compiler 900 can retrieve the intrinsics.

FIG. 9-B is a flowchart illustrating a process to add a compiler intrinsic to a compiler intrinsic library. Process 950 depicts the process of adding a new intrinsic function into LLVM's C compiler. It is understood that intrinsics can also be added into other publicly available Open Source compilers or commercially available compilers of C programming language or any other programming language which support compiler intrinsics. Part of the process 950 is described in further detail in Misha Brukman et al., *Extending LLVM. Adding instructions, intrinsics, types*, etc., Sep. 22, 2007.

A first step 955 can be building an intrinsic. Building an intrinsic can involve determining what basic math function will be developed with limited accuracy, e.g., exp, log, etc.; determining degrees of accuracy to implement, e.g., 1-bit, 8-bit, 23-bit (which is equivalent to full accuracy), etc., in single precision floating point arithmetic; determining limited domain for arguments, e.g. [0, +∞); and implementing the limited accuracy or limited domain functions.

A second step 960 can be adding the intrinsic into a compiler system. Adding the intrinsic into a compiler system can involve entering the intrinsic into system documentation; adding an entry into an intrinsic target description file; describing the memory access characteristics of the intrinsic for optimization; adding constant folding support (if any) to a constant folding module of the compiler; and adding test cases for a test suite of the compiler.

A third step 970 can be adding support to the C backend. Adding support to the C backend can involve adding code to lower the intrinsics in a module that lowers intrinsics, if it is sensible to do so; emitting an expansion in corresponding places if it is sensible to lower the intrinsic to an expanded sequence of C code in all cases; and having code generator emit error messages and calls abort if the intrinsic has no way to be lowered.

A fourth step 980 can be adding support for a target definition file. Adding support for a target definition (.td) file can comprise adding a pattern to the .td file that matches the intrinsic and adding the instructions to be generated.

Figure 10:
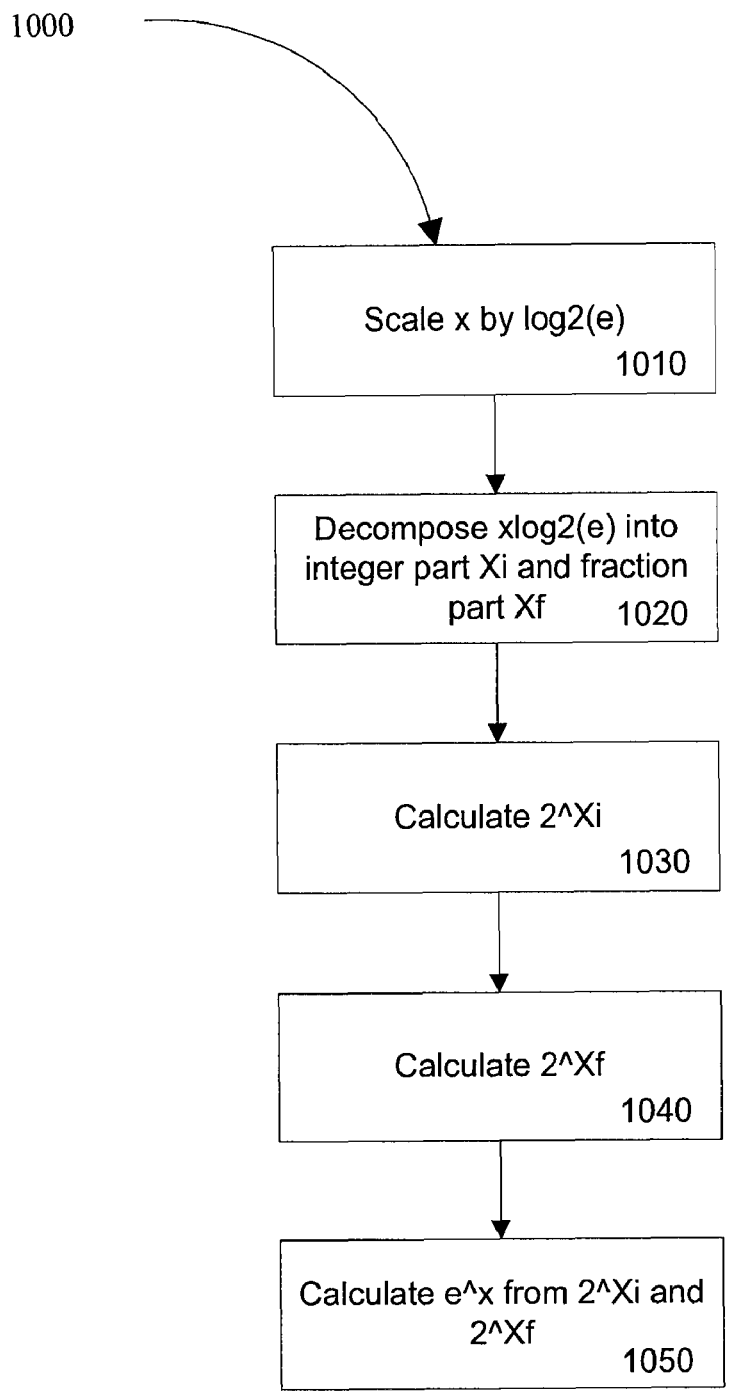
FIG. 10 is a flowchart illustrating an example detailed implementation of a function with reduced accuracy requirement and enhanced performance granularity.

FIG. 10 is a flowchart illustrating an example detailed implementation of a function with reduced accuracy requirement and enhanced performance granularity. For illustration purposes only, the function exp (for $e^x$ or $e^x$, which are used interchangeably) is calculated with reduced accuracy and enhanced performance granularity in a routine 1000 approximateExp(x). The type of the return value of function approximateExp(x) and the type of the argument x are both float, i.e. single precision, 32-bit floating point number in this example. It is understood that other types of argument or return value can be implemented similarly. A first step 1010 can be scaling x. The variable x is scaled by $\log_2(e)$. This is done by multiplying x by log2(e), a constant.

A next step 1020 can be decomposing the result of step 1010. The value $x\log_2(e)$ is decomposed into an integer part (Xi) and a fractional part (Xf):

$$x \log_2(e) = Xi + Xf \quad (1)$$

A next step 1030 can be calculating 2^Xi. This is calculating the value of 2 to the power of the integer part of x $\log_2(e)$, which is 2^Xi. This can be done, for example, by an addition to the exponent part of floating point number Xi. Note that calculating 2^Xi can be efficient because addition is a simple calculation.

A next step 1040 can be calculating 2^Xf. 2^Xf can be computed by a minimax Chebyshev approximation over space [−1,1] to cover positive and negative arguments. Different Chebyshev minimax approximations can be applied to deliver 6-, 12-, and 18-bits of accuracy, or other levels of accuracy. For example, the following formulae yield respective errors of less than 0.0144107717 (6-bit accuracy), 0.000107046256 (13-bit accuracy), and 2.74×10^(−7) (18-bit accuracy):

$$2\hat{}Xf = 0.997535578 + (0.735607626 + 0.252464424*x)*x \quad (2)$$

$$2\hat{}Xf = 0.999892986 + (0.696457318 + (0.224338339 + 0.792043434e-1*x)*x)*x \quad (3)$$

$$2\hat{}Xf = 0.999999982 + (693148872 + (0.240227044 + (0.554906021e-1 + (0.961591928e-2 + (0.136028312e-2 + 0.157059148e-3*y)*x)*x)*x)*x)*x \quad (4)$$

A next step 1050 can be calculating the value $e^x$. The value of $e^x$ can be assembled from the values 2^Xi and 2^Xf based on the formula $$e\hat{}x2\hat{}x \log2(e)2\hat{}Xi*2\hat{}Xf \quad (5)$$

The reduced accuracy exponential function in the example above is limited not only in precision, but also in error handling abilities. In this particular example, the variable x is required to be an IEEE-754 value. Therefore, denormal numbers, signed zeros, signed infinities and signed NaNs may not return the right value. Further, the compiler must correctly support IEEE-754 single precision format and "rounded to nearest" basic operations.

The above algorithm at 6-bit accuracy (using formula 2) takes approximately 25.9 CPU cycles to execute, when running on a 2.33 GHz Merom processor running Mac OS X (10.5.3). Merom is the code name of mobile version of the Core 2 CPU available from Intel Corp., Santa Clara, Calif. Mac OS X is a computer operating system available from Apple, Inc., Cupertino, Calif. The CPU and operating system listed are merely exemplary. This implementation and other implementations of the programmable compiler does not require a particular CPU or operating system. Various other CPUs or operating systems may be used to run the compiler.

Other implementations of the limited accuracy exp function may contain more or fewer limitations. Those implementations with more limitations, such as requiring x>0, may incur fewer CPU cycles to complete. Conversely, those with fewer limitations, such as permitting x to be a non-IEEE 754 value, may incur additional CPU cycles during execution.

Similar routines can be written for, but not limited to, reduced accuracy or limited domain math functions such as approximateOfPowerOf10 for calculating 10^X, approximateOfPowerOf2 for 2^x, approximateLog for log(x), approximateLog 2 for $\log_2(x)$, approximateLog 10 for $\log_{10}(x)$, approximateSqrt for sqrt(x), and approximatePower for x^y. These functions can have return types of int, long int, float, double, or other types available in the programming language in which the functions were written. The precision requirement can be, but is not limited to, 1-bit, 6-bit, 12-bit, or 18-bit. The variable domain can be, but is not limited to, (−∞, +∞), [0, ∞), [0, 1], etc.

Figure 11:
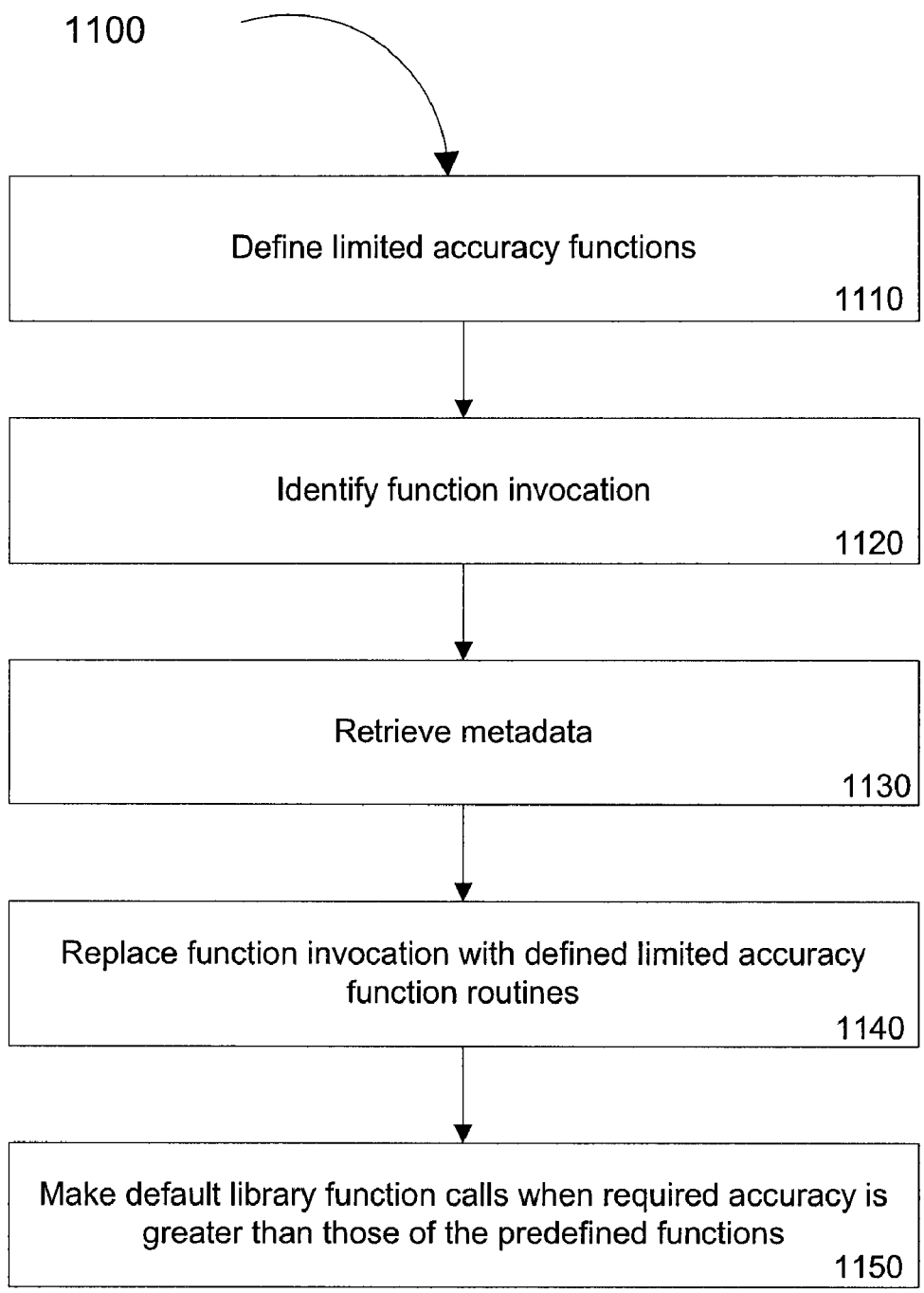
FIG. 11 is a flowchart showing an example method of the programmable compiler.

FIG. 11 is a flowchart showing a method implementing the programmable compiler. Process 1100 is one implementation of the programmable compiler. A first step 1110 can be defining limited accuracy functions. A set of one or more instructions to compute mathematical functions is defined. The instructions implement functions, such as exponential functions (y=10^x, y=2^x, or y=e^x), logarithm functions (y=log(x), y=$\log_2(x)$, or y=$\log_2(x)$), or other functions. These functions can be implemented in a range of limited precisions, such as, but not limited to, 6-bit, 12-bit, or 18-bit. The functions can also be implemented for a limited argument domain. For example, where in general, the domain of x in exponential functions is (−∞, +∞), a function can be written with limited argument domain [0, +∞), to further reduce the CPU cycles required for the computation. A function can be written with limited precision only, with limited argument domain only, or with both limited precision and limited argument domain. These functions can be written in a language such as, but not limited to, C, C++, FORTRAN, or another imperative programming language. These functions can be built directly into a compiler, or into a library referred to by the compiler. Specifically, these functions can be written as complier intrinsics.

Another step 1120 can be identifying function invocation. The programmable compiler is used to compile source code into object code. The programmable compiler detects the mathematical function calls during compilation. Based on various implementations, the programmable compiler can detect the invocation of specific mathematical functions during lexical analysis, preprocessing, parsing, or semantic analysis, or other compiler operations.

Another step 1130 can be retrieving metadata. The programmable compiler retrieves the metadata for the mathematical function, and the type of l-value in some implementations. The metadata can include limitation factors such as limited accuracy requirement, limited argument domain, limited error handling requirement (e.g. when the routine calling the function guarantees that the arguments are IEEE-754 compliant), among others.

In some implementations, the limitation factors can come from a function name itself. In the following example, the function name indicates that it requires 8-bit accuracy:

float y=exp_limited_accuracy8(x);

In some implementations, the limitation factors can come from one or more extra function arguments. In the following example, the additional argument "8" tells the compiler that 8-bit accuracy is required:

float=yexp_limited_accuracy(x, 8);

In some implementations, the limitation factors can come from an intrinsic type of the l-value in an assignment. In the following example, type _float_8 tells the compiler that the assignment to variable y requires the r-value to be 8-bit accurate:

_float_8 y;
y = exp(x);

In some implementations, the limitation factors can come from one or more variable attributes. The limitation factors license the compiler to use the fastest routine that delivers the requested precision in cases where the result is assigned to the chosen variable. This method can be allowed to license other substitutions, such as substituting division with reciprocal multiplication, etc. An example is:

float y_attribute_((limited_accuracy(8)),

In some implementations, the limitation factors can come from function decoration, e.g.:

y=exp(x)_limited_accuracy_((8));

In some implementations, the limitation factors can come from function subscripting abuse, e.g.:

float y=exp_limited_accuracy[8](x);

In some implementations, the limitation factors can come from compiler directives affecting all functions, e.g.:

pragma limitedAccuracy 8
y=exp(x);
pragma limited Accuracy OFF

In some implementations, the limitation factors can come from compiler directives affecting a specific function name, e.g.:

pragma limitedAccuracy exp 8
y=exp(x);
pragma limited Accuracy exp OFF

In some compiler-centric implementations, the compiler can determine the limited accuracy or limited domain requirements independent from the underlying mathematical function. One compiler-centric implementation can be done via compiler built-in, e.g.:

y=_builtin_exp_limited_accuracy(x, 8);

Another compiler-centric implementation be done via setting a reduced-accuracy flag by one or more command-line compiler options or one or more make file switches at per-source-file level, e.g.:

>gcc foo.c−flibmAccuracy=8

Yet another compiler-centric implementation can be done via setting a reduced-accuracy flag by one or more command-line compiler options or one or more make file switches at per-function-name level, e.g.:

>gcc foo.c−flibmAccuracy="exp 8"

In some other linker-centric implementations, the subroutines are built into one or more libraries. These libraries are chosen by the linker over the default math library such as libm.

One example of a linker-centric approach is providing the limited accuracy information using linker option at the per-object-file level, when link-time optimization is available, e.g.:

>llvm−gcc foo.o WI, −libimAccuracy−8

Another example of a linker-centric approach is providing the limited accuracy information using linker option at the per-function-name level, when there is link-time optimization, e.g.:

>llvm-gcc foo.c-Wl, –libmAccuracy="exp 8"

A next step 1140 can be replacing function invocation with defined limited accuracy function routines. The compiler makes a determination based on the metadata retrieved. The compiler subsequently retrieves the function's requirements on accuracy or domain or both from the metadata. After the compiler retrieves the requirements, the compiler attempts to locate in its intrinsic library one or more routines that satisfy the requirement. If the compiler locates one routine that matches the requirement on accuracy or domain or both, it replaces the function invocation with the routine in its intrinsic library. If more than one routines satisfy the requirement, the programmable compiler replaces the mathematical function invocation with the routine that most closely matches the requirement. The programmable compiler generates resulting object code containing the routine. The resulting object code is optimized using the standard compiler optimization.

A preferred implementation is to generate inline instructions in the object code. The inline instructions from compiler intrinsics are often more efficient than function calls, because inline instructions do not have the function call overheads. Further more, the inline instructions from compiler intrinsics can be more efficient than even conventional inline code, because the compiler can have built-in knowledge on how the intrinsics behave. However, generating inline instructions is not the only possible implementation. The programmable compiler can choose an implementation that maximizes target code performance, as part of the compiler optimization.

Another step 1150 can be making default library calls. If the programmable compiler is unable to find a subroutine in the programmable compiler's intrinsic library that can satisfy the accuracy requirement in the metadata of the function, it leaves the function invocation unchanged. The reason for the inability can be that the accuracy requirement exceeds all functions for that particular operation in the intrinsic library, or no reduced accuracy routine is defined for the particular underlying math operation, or the value of the argument exceeds the reduced domain of the function, or a combination of some or all of the reasons. Under these scenarios, the programmable compiler preserves the default function call. The final application therefore can contain the object code and the default math library.

Figure 12:
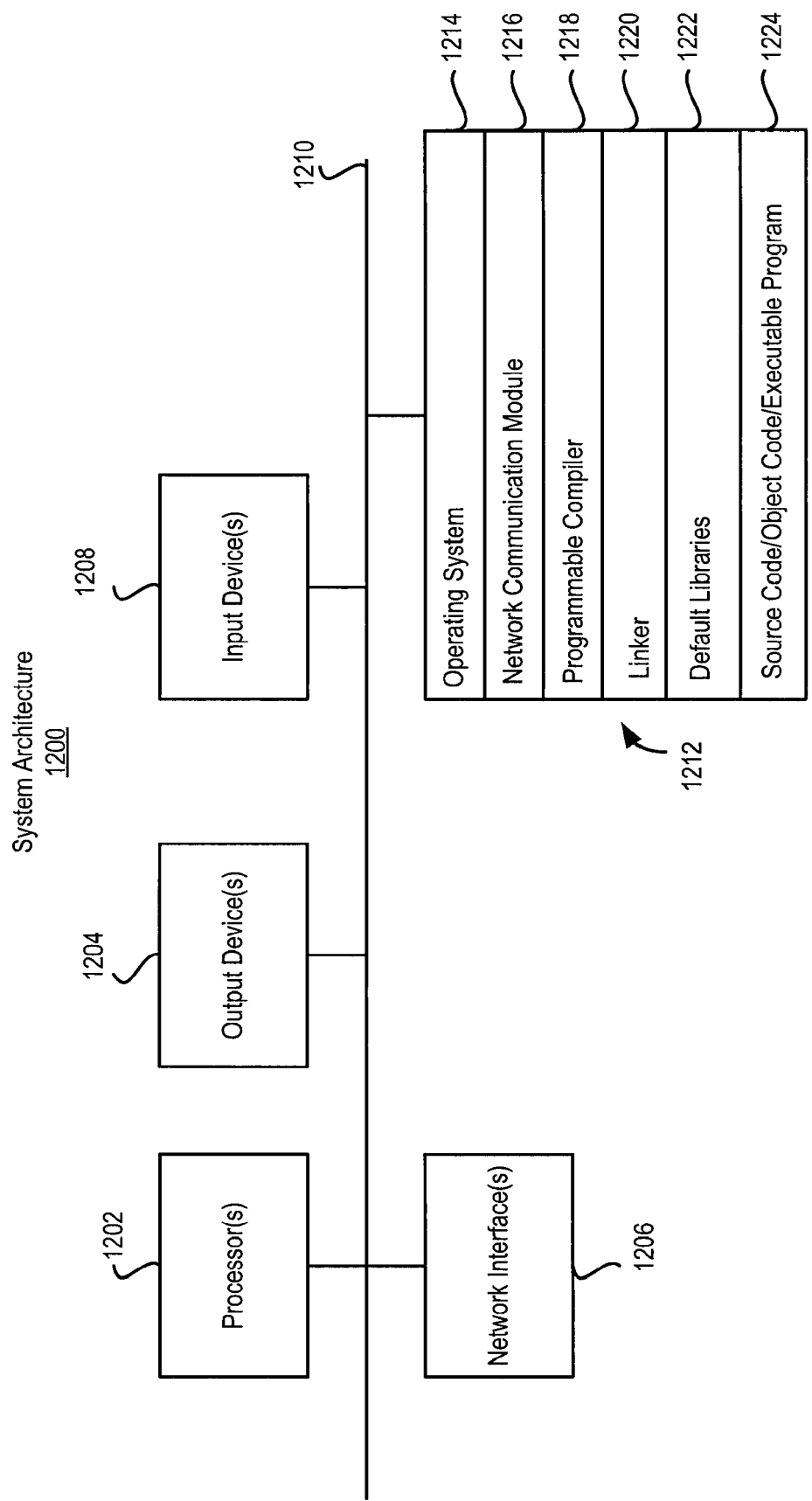
FIG. 12 illustrates an example computer system that performs an enhanced compilation as described in reference to FIGS. 1-11.

FIG. 12 is a block diagram of a system architecture 1200 for implementing the features and operations described in reference to FIGS. 1-11. Other architectures are possible, including architectures with more or fewer components. In some implementations, the architecture 1200 includes one or more processors 1202 (e.g., dual-core Intel® Xeon® Processors), one or more output devices 1204 (e.g., LCD), one or more network interfaces 1206, one or more input devices 1208 (e.g., mouse, keyboard, touch-sensitive display) and one or more computer-readable mediums 1212 (e.g., RAM, ROM, SDRAM, hard disk, optical disk, flash memory, etc.). These components can exchange communications and data over one or more communication channels 1210 (e.g., buses), which can utilize various hardware and software for facilitating the transfer of data and control signals between components.

The term "computer-readable medium" refers to any medium that participates in providing instructions to a processor 1202 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

The computer-readable medium 1212 further includes an operating system 1214 (e.g., Mac OS® server, Windows® NT server), a network communication module 1216, a programmable compiler 1218 (e.g., GCC), a linker 1220, libraries 1222, and files containing source code, object code and executable programs 1224. The operating system 1214 can be multi-user, multiprocessing, multitasking, multithreading, real time, etc. The operating system 1214 performs basic tasks, including but not limited to: recognizing input from and providing output to the devices 1206, 1208; keeping track and managing files and directories on computer-readable mediums 1212 (e.g., memory or a storage device); controlling peripheral devices; and managing traffic on the one or more communication channels 1210. The network communications module 1216 includes various components for establishing and maintaining network connections (e.g., software for implementing communication protocols, such as TCP/IP, HTTP, etc.).

The architecture 1200 is one example of a suitable architecture for hosting a browser application having audio controls. Other architectures are possible, which include more or fewer components. The architecture 1200 can be included in any device capable of hosting a compiler. The architecture 1200 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

The method of using reduced accuracy instruction can be built into a microprocessor. The microprocessor can be a general purpose microprocessor such as a CPU or System-on-a-Chip (SoC), or a special purpose microprocessor such as a microcontroller, a math processor, a digital signal processors (DSP), or a graphics processing unit (GPU). A microprocessor can accept a set of instructions, upon which the microprocessor perform operations such as math operations including addition, subtraction, multiplication, and division. The actual operations can be built into electric circuits that are parts of an arithmetic logic unit (ALU). One example of the present method for performing reduced-accuracy calculations is to build the routines for reduced accuracy calculations into electric circuits of the microprocessor, and to define a set of instructions that are machine instructions, such that the calculation can be performed by the hardware. The result of the reduced-accuracy calculations can be written to a memory, an output device, or to a computer-readable medium.

A number of implementations have been described. Nevertheless, it will be understood that various modifications can be made without departing from the spirit and scope of the invention. For example, the examples were given in C programming language. However, the programmable compiler can be implemented for any imperative computer programming language. Also, the function exp was given to illustrate the efficiency of a reduced accuracy routine. Other mathematical functions can be written to increase efficiency from the standard functions. Accordingly, other implementations are within the scope of the following claims.

What is claimed is:

1. A computer-implemented method for compiling source code into object code, comprising:
   identifying, from the source code, a math function invocation;
   determining a selection criterion of the math function invocation based on a compiler-specific data type of an l-value of the math function invocation, the selection criterion specifying that an accuracy requirement of the math function invocation, as measured in number of bits specified in the compiler-specific data type, is less than an accuracy of the math function being invoked, wherein the math function is stored in a math library;
   determining, based on the selection criterion, that one or more instructions from a compiler library are configured to perform a mathematical calculation corresponding to the math function less accurately than the math function, wherein an accuracy of the mathematical calculation satisfies the accuracy requirement specified by the selection criterion; and
   in response to the determining, replacing the math function invocation with the one or more instructions, including storing the one or more instructions inline in the object code, wherein, upon execution of the object code, the one or more instructions are executed in place of invoking the math function from the math library.

2. The method of claim 1, wherein the one or more instructions are stored in a library internal to the compiler.

3. The method of claim 2, wherein the library internal to the compiler is a collection of one or more compiler intrinsics.

4. The method of claim 1, wherein:
   the one or more instructions having limited accuracy have reduced variable domain;
   the selection criterion further comprises one or more parameter values; and
   the replacing is further based on a determination that the one or more parameter values of the selection criterion are within the reduced variable domain of the one or more instructions.

5. The method of claim 1, wherein the accuracy requirement is between 1-bit to 23-bit, inclusive, in single precision floating point arithmetic.

6. The method of claim 1, wherein the accuracy requirement is defined by intrinsic name.

7. The method of claim 1, wherein the accuracy requirement is defined by one or more extra function arguments.

8. The method of claim 1, wherein the accuracy requirement is defined by one or more variable attributes of the l-value.

9. The method of claim 1, wherein the accuracy requirement is defined by a specific type of the l-value.

10. The method of claim 1, wherein the accuracy requirement is defined by function decoration.

11. The method of claim 1, wherein the accuracy requirement is defined by function subscripting abuse.

12. The method of claim 1, wherein the accuracy requirement is defined by compiler built-in.

13. The method of claim 1, wherein the accuracy requirement is defined by compiler directives affecting all functions.

14. The method of claim 1, wherein the accuracy requirement is defined by compiler directives affecting specific function names.

15. The method of claim 1, wherein the accuracy requirement is defined by compiler option at per-source-file level.

16. The method of claim 1, wherein the accuracy requirement is defined by one or more linker options at per-object-file level.

17. The method of claim 1, wherein the accuracy requirement is defined by one or more linker options at per-function-name level.

18. The method of claim 1, further comprising:
   optimizing the object code.

19. The method of claim 1, further comprising:
   storing the object code on a computer-readable medium.

20. A non-transitory computer-readable medium storing a computer program which, when executed by a computer processor, causes the computer processor to perform operations for compiling source code into object code, the operations comprising:

identifying, from the source code, a math function invocation;

determining a selection criterion of the math function invocation based on a compiler-specific data type of an l-value of the math function invocation, the selection criterion specifying that an accuracy requirement of the math function invocation, as measured in number of bits specified in the compiler-specific data type, is less than an accuracy of the math function being invoked, wherein the math function is stored in a math library;

determining, based on the selection criterion, that one or more instructions from a compiler library are configured to perform a mathematical calculation corresponding to the math function less accurately than the math function, wherein an accuracy of the mathematical calculation satisfies the accuracy requirement specified by the selection criterion; and in response to the determining, replacing the math function invocation with the one or more instructions, including storing the one or more instructions inline in the object code, wherein, upon execution of the object code, the one or more instructions are executed in place of invoking the math function from the math library.

21. The non-transitory computer-readable medium of claim 20, wherein the one or more instructions are stored in a library internal to a compiler.

22. The non-transitory computer-readable medium of claim 21, wherein the library internal to the compiler is a collection of one or more compiler intrinsics.

23. The computer-readable medium of claim 20, wherein:
the one or more instructions having limited accuracy have reduced variable domain;
the selection criterion further comprises one or more parameter values; and
the replacing is further based on a determination that the one or more parameter values of the selection criterion are within the reduced variable domain of the one or more instructions.

24. The non-transitory computer-readable medium of claim 20, wherein the accuracy requirement is between 1-bit to 23-bit, inclusive, in single precision floating point arithmetic.

25. The non-transitory computer-readable medium of claim 20, wherein the accuracy requirement is defined by intrinsic name.

26. The non-transitory computer-readable medium of claim 20, wherein the accuracy requirement is defined by one or more extra function arguments.

27. The non-transitory computer-readable medium of claim 20, wherein the accuracy requirement is defined by one or more variable attributes of the l-value.

28. The non-transitory computer-readable medium of claim 20, wherein the accuracy requirement is defined by a specific type of the l-value.

29. The non-transitory computer-readable medium of claim 20, wherein the accuracy requirement is defined by function decoration.

30. The non-transitory computer-readable medium of claim 20, wherein the accuracy requirement is defined by function subscripting abuse.

31. The non-transitory computer-readable medium of claim 20, wherein the accuracy requirement is defined by compiler built-in.

32. The non-transitory computer-readable medium of claim 20, wherein the accuracy requirement is defined by compiler directives affecting all functions.

33. The non-transitory computer-readable medium of claim 20, wherein the accuracy requirement is defined by compiler directives affecting specific function names.

34. The non-transitory computer-readable medium of claim 20, wherein the accuracy requirement is defined by compiler option at per-source-file level.

35. The non-transitory computer-readable medium of claim 20, wherein the accuracy requirement is defined by one or more linker options at per-object-file level.

36. The non-transitory computer-readable medium of claim 20, wherein the accuracy requirement is defined by one or more linker options at per-function-name level.

37. The non-transitory computer-readable medium of claim 20, the operations further comprising:
optimizing the object code.

38. The non-transitory computer-readable medium of claim 20, the operations further comprising:
storing the object code on a computer readable medium.

39. A system comprising:
a processor;
memory coupled to the processor and operable for storing instructions, which, when executed by the processor, causes the processor to perform operations for compiling source code into object code, the operations comprising:
identifying, from the source code, a math function invocation;
determining a selection criterion of the math function invocation based on a compiler-specific data type of an l-value of the math function invocation, the selection criterion specifying that an accuracy requirement of the math function invocation, as measured in number of bits specified in the compiler-specific data type, is less than an accuracy of the math function being invoked, wherein the math function is stored in a math library;
determining, based on the selection criterion, that one or more instructions from a compiler library are configured to perform a mathematical calculation corresponding to the math function less accurately than the math function, wherein an accuracy of the mathematical calculation satisfies the accuracy requirement specified by the selection criterion; and
in response to the determining, replacing the math function invocation with the one or more instructions, including storing the one or more instructions inline in the object code, wherein, upon execution of the object code, the one or more instructions are executed in place of invoking the math function from the math library.

40. The system of claim 39, wherein the one or more instructions are stored in a library internal to a compiler.

41. The system of claim 40, wherein the library internal to the compiler is a collection of one or more compiler intrinsics.

42. The system of claim 39, wherein:
the one or more instructions having limited accuracy have reduced variable domain;
the selection criterion further comprises one or more parameter values; and
the replacing is further based on a determination that the one or more parameter values of the selection criterion are within the reduced variable domain of the one or more instructions.

43. The system of claim 39, wherein the accuracy requirement is between 1-bit to 23-bit, inclusive, in single precision floating point arithmetic.

44. The system of claim 39, wherein the accuracy requirement is defined by intrinsic name.

45. The system of claim 39, wherein the accuracy requirement is defined by one or more extra function arguments.

46. The system of claim 39, wherein the accuracy requirement is defined by one or more variable attributes of the l-value.

47. The system of claim 39, wherein the accuracy requirement is defined by a specific type of the l-value.

48. The system of claim 39, wherein the accuracy requirement is defined by function decoration.

49. The system of claim 39, wherein the accuracy requirement is defined by function subscripting abuse.

50. The system of claim 39, wherein the accuracy requirement is defined by compiler built-in.

51. The system of claim 39, wherein the accuracy requirement is defined by compiler directives affecting all functions.

52. The system of claim 39, wherein the accuracy requirement is defined by compiler directives affecting specific function names.

53. The system of claim 39, wherein the accuracy requirement is defined by compiler option at per-source-file level.

54. The system of claim 39, wherein the accuracy requirement is defined by one or more linker options at per-object-file level.

55. The system of claim 39, wherein the accuracy requirement is defined by one or more linker options at per-function-name level.

56. The system of claim 39, wherein the processor performs operations further comprising:
   optimizing the object code.

57. The system of claim 39, wherein the processor performs operations further comprising:
   storing the object code on a non-transitory computer-readable medium.

* * * * *